(No Model.)
J. T. ROGERS.
SHACKLE.
No. 251,464. Patented Dec. 27, 1881.
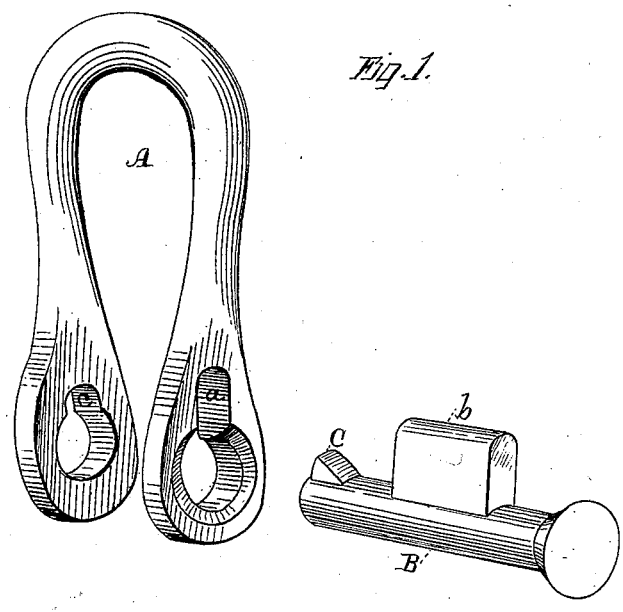
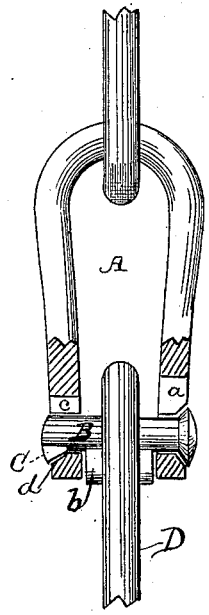
Witnesses
Geo. H. Strong
Frank A. Brooks
Inventor
James T. Rogers
By Dewey & Co.
Attys
N. PETERS. Photo-Lithographer, Washington, D. C.

UNITED STATES PATENT OFFICE.

JAMES T. ROGERS, OF WESTPORT, CALIFORNIA.

SHACKLE.

SPECIFICATION forming part of Letters Patent No. 251,464, dated December 27, 1881.

Application filed June 19, 1880. (No model.)

*To all whom it may concern:*

Be it known that I, JAMES T. ROGERS, of Westport, county of Mendocino, State of California, have invented an Improved Shackle; and I hereby declare the following to be a full, clear, and exact description thereof.

My invention relates to a new and useful device for connecting or uniting cables; and it consists of an open link, the shanks of which are perforated and have extended slots connecting therewith, through which a bolt passes, said bolt having a lug or projection at the end opposite the head, and a rib to fit between the shanks of the link. The bolt passes through the adjacent closed link, the rib on the bolt being of a length greater than the width of said link, so that the bolt, after being introduced through it, will be turned by it, so that its lug and rib will turn away from the slots in the shanks of the open link, whereby it will be locked in place and retained, all of which will hereinafter more fully appear.

The object of my invention is to provide a convenient and easy connection for chains or cables which are to be fastened to buoys, anchors, &c.

In the ordinary method the bolt is fastened with a key, which is separate therefrom, and is liable to be lost or misplaced at a critical moment.

In my invention this is obviated by having the bolt fastened by the extended rib, which, being connected therewith, cannot be lost, and is operated by the cable itself.

Reference being now had to the accompanying drawings, Figure 1 shows a view of the device with the bolt removed. Fig. 2 shows a view of the same with the bolt in place.

Let A represent an open link, the shanks of which are provided with a bolt-hole, as shown. Connected with the bolt-hole in one shank is the slot $a$, and with the bolt-hole in the other shank is a smaller slot, $c$.

Let B represent the bolt. On the end of the bolt B, opposite the head, is the lug or projection C, and to the middle portion of the bolt is cast a rib, $b$, both lug C and rib $b$ being on the same side of the bolt B. The length of this rib $b$ upon the bolt is greater than the width of the connecting or closed link D, so that when placed within the said link it cannot turn around within it, but will be itself turned by the link.

To connect the closed link to the open link A the bolt B is turned up, so that its rib $b$ will be in line with the slot $a$, and the bolt is withdrawn. The link is then put in between the shanks of the open link A and held in such a position as to allow the bolt to be pushed into place by its rib $b$ passing through the slot $a$ and through the link, its end lug, C, passing through the smaller slot $c$ in the other shank. By turning the link down the bolt B, because its rib $b$ is too long to turn within the link, is carried around with the link, and its rib $b$ and lug C being thus turned away from the slot, the bolt is locked in the bolt-hole. When once turned down the bolt cannot be removed unless the link is turned back again, because the rib $b$ on the bolt will not turn in the link.

Having thus described my invention, what I claim as new, and desire to secure by Letters Patent, is—

The shackle-link A, constructed as shown, and link D, in combination with coupling-pin B, provided with a projection, C, and rib $b$, said rib being wider than the interior transverse dimension of link D, as set forth.

In witness whereof I have hereunto set my hand.

JAMES T. ROGERS.

Witnesses:
ALBERT SWITZER,
F. W. STEWART.